US008593273B2

(12) United States Patent
Gotschlich et al.

(10) Patent No.: US 8,593,273 B2
(45) Date of Patent: Nov. 26, 2013

(54) SYSTEMS AND METHODS FOR LOCALIZATION OF TIRE PRESSURE MONITORING SYSTEM WHEEL MODULES

(75) Inventors: Martin Gotschlich, Markt Schwaben (DE); Thomas Lange, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 471 days.

(21) Appl. No.: 13/022,345

(22) Filed: Feb. 7, 2011

(65) Prior Publication Data
US 2012/0200408 A1    Aug. 9, 2012

(51) Int. Cl.
*B60C 23/10* (2006.01)

(52) U.S. Cl.
USPC ...... 340/445; 340/442; 340/447; 340/426.33; 701/83; 701/49; 73/146; 73/146.2; 157/1

(58) Field of Classification Search
USPC ............ 340/442–444, 447, 449, 426.33; 73/146–146.8; 701/49, 83; 157/1
See application file for complete search history.

(56) References Cited

U.S. PATENT DOCUMENTS

| | | |
|---|---|---|
| 5,247,831 A | 9/1993 | Fioravanti |
| 5,749,984 A | 5/1998 | Frey |
| 6,112,587 A | 9/2000 | Oldenetell |
| 6,208,949 B1 | 3/2001 | Eatwell |
| 6,278,361 B1 | 8/2001 | Magiawala |
| 6,507,804 B1 | 1/2003 | Hala |
| 6,604,416 B2 | 8/2003 | Tsujita |
| 6,917,887 B2 | 7/2005 | Henry |
| 7,010,968 B2 | 3/2006 | Stewart |
| 7,227,458 B2 | 6/2007 | Watabe |
| 7,313,952 B2 | 1/2008 | Brusarosco |
| 7,336,161 B2 | 2/2008 | Walraet |
| 7,412,879 B2 | 8/2008 | Serra |
| 7,417,536 B2 | 8/2008 | Lakshmanan |
| 7,443,288 B2 | 10/2008 | Dunbridge |
| 7,536,903 B2 | 5/2009 | Schillinger |

(Continued)

FOREIGN PATENT DOCUMENTS

| | | |
|---|---|---|
| EP | 0887211 | 1/2003 |
| EP | 1293362 B1 | 9/2007 |

(Continued)

OTHER PUBLICATIONS

Kalinin, Victor. "Wireless Physical SAW Sensors for Automotive Applications", 2011, *IEEE*, 10 pages.

(Continued)

*Primary Examiner* — George Bugg
*Assistant Examiner* — Sharmin Akhter
(74) *Attorney, Agent, or Firm* — Patterson Thuente Pedersen, P.A.

(57) ABSTRACT

Embodiments relate to unidirectional TPMS utilizing information from a corresponding vehicle system in order to correlate with vehicle speed information to be used in a tire localization methodology. In an embodiment, the vehicle system is an anti-lock brake system (ABS), and the vehicle speed can be used in a localization scheme that reconstructs a +/−1 g ripple with waveform, amplitude, frequency and phase parameters. Because the waveform is known to be sinusoidal (due to the wheel rotation), the amplitude is known to be 2 g peak-to-peak (due to the gravitational +/−1 g), the frequency depends on vehicle speed (which can be estimated from centrifugal force measurements), and an algorithm is discussed herein for determining the phase by correlation, the +/−1 g ripple can be reconstructed and the wheels localized therefrom.

25 Claims, 5 Drawing Sheets

(56) References Cited

U.S. PATENT DOCUMENTS

| | | |
|---|---|---|
| 7,546,764 B2 | 6/2009 | Morinaga |
| 7,557,697 B2 | 7/2009 | Bauer |
| 7,558,686 B1 | 7/2009 | Morello |
| 7,673,505 B2 | 3/2010 | Hammerschmidt |
| 7,693,626 B2 | 4/2010 | Breed |
| 7,930,132 B2 | 4/2011 | Watasue |
| 8,255,117 B2 | 8/2012 | Bujak |
| 8,332,092 B2 | 12/2012 | Laermer |
| 2003/0058118 A1 | 3/2003 | Wilson |
| 2003/0197603 A1 | 10/2003 | Stewart |
| 2004/0090322 A1 | 5/2004 | Tsujita |
| 2005/0150284 A1 | 7/2005 | Hernando |
| 2005/0248446 A1 | 11/2005 | Watabe |
| 2006/0087420 A1 | 4/2006 | Walraet |
| 2007/0107505 A1 | 5/2007 | Schillinger |
| 2007/0240502 A1 | 10/2007 | Morinaga |
| 2008/0243334 A1 | 10/2008 | Bujak |
| 2010/0030512 A1 | 2/2010 | Hoeffel |
| 2011/0071737 A1 | 3/2011 | Greer |

FOREIGN PATENT DOCUMENTS

| | | |
|---|---|---|
| EP | 1832881 | 9/2007 |
| WO | WO 2009/060093 | 5/2009 |
| WO | WO 2011/085878 | 7/2011 |

OTHER PUBLICATIONS

Bo et al., "Non-Uniform Sampling Signal Spectral Estimation of Tire Pressure Monitoring System Using Wavelet Transform", 2007, *IEEE*, 10 pages.

Jiang et al., A New Intelligent Tire Pressure Monitoring System, 2011, *IEEE*, 4 pages.

Application and File History for U.S. Appl. No. 12/131,951, filed Jun. 3, 2008, Inventors: Gotschlich et al.

Application and File History for U.S. Appl. No. 13/332,910, filed Dec. 21, 2011, Inventors: Steiner.

SYSTEMS AND METHODS FOR LOCALIZATION OF TIRE PRESSURE MONITORING SYSTEM WHEEL MODULES

TECHNICAL FIELD

The invention relates generally to tire pressure monitoring systems (TPMS) and more particularly to localization of TPMS wheel modules on a vehicle.

BACKGROUND

Tire pressure monitoring systems (TPMS) on vehicles are generally required in the U.S., with Europe and countries in Asia to follow. The legislation mandating the use of TPMS typically sets a pressure warning threshold level which is monitored by wheel-based units, or wheel modules, in direct TPMS. The wheel modules are mounted inside of each tire, such as on the rim, valve or in-tire, in order to periodically or continuously monitor the inflation pressure of the tire.

Each wheel module typically includes a pressure sensor, control logic such as a microcontroller, a power source such as a battery, and a radio frequency (RF) transmitter that communicates pressure readings from the pressure sensor to central TPMS receiver mounted elsewhere in the vehicle. Some wheel modules also comprise an acceleration sensor for determining when the vehicle is in motion in order to conserve battery life. TPMS wheel modules typically include a unique identification code in the RF frame so that the central TPMS receiver can identify one wheel module from another, as well as distinguish wheel modules of one vehicle from those of another when vehicles are close enough that signals from one may reach another.

The process of identifying which wheel module sent a particular signal, and therefore which tire may have low pressure, is called localization. When a low pressure situation is detected, drivers generally want to know which tire is low, rather than simply that one of the tires is low which often requires each to be checked in order to determine which tire actually needs attention. Effective and efficient localization is an on-going challenge in TPMS because tires are frequently rotated and sometimes changed out between summer and winter, altering their positions. Additionally, power constraints on the wheel modules make frequent communications and localization signal transmissions impractical.

Some TPMS localize by including a low frequency initiator in the wheel well near each tire. In use, the initiator triggers its corresponding wheel module for a pressure reading on-demand. While such TPMS can effectively localize readings from each tire, they are relatively expensive and complex.

Another example localization scheme takes advantage of the acceleration sensor in the TPMS. As previously mentioned, an acceleration sensor is often included in TPMS for motion sensing by measuring the centrifugal acceleration force in g's. Given the mounting of the TPMS in the wheel and the rotation of the wheel when in motion, the orientation of the sensor changes during each wheel revolution (e.g., right-side up, sideways, upside-down, sideways, right-side up, etc.). This causes a signal change of +/−1 g because of the effects of gravity, which while rotating over time results in a sinusoidal ripple on top of the centrifugal acceleration signal. This signal can be measured by low-g sensors, such as are used for pure motion detection. Low-g sensors, however, have limited dynamic range (e.g., <50 km/h), which makes them undesirable for this type of localization. High-g sensors, such as those suitable for ranges of 250 km/h or more, can be used instead, though the challenge of measuring the sinusoidal signal on top of the centrifugal acceleration signal remains. It may be possible to utilize a high-resolution analog-to-digital (ADC) converter and/or an analog high-pass filter before the ADC, but these configurations increase power consumption and can add cost to the TPMS and/or require additional die area, making them impractical.

Therefore, there is a need for improved localization techniques.

SUMMARY

In an embodiment, a method comprises receiving signals comprising tire pressure monitoring system (TPMS) module identification codes; building a correlation table of counter values from counters coupled to anti-lock braking systems (ABS) at each wheel of a vehicle; reviewing the correlation table for stable counter values associated with TPMS module identification codes; determining a TPMS module identification code associated with the stable counter values; localizing TPMS wheel modules by assigning an ABS counter associated with the stable counter values to the determined TPMS module identification code.

In an embodiment, a method comprises measuring a centrifugal acceleration of a tire pressure monitoring system (TPMS) wheel module; determining a frequency of a +/−1 g signal associated with the wheel module; determining an optimized sampling frequency; and determining a phase of the +/−1 g signal by measuring the centrifugal acceleration of the wheel module at the optimized sampling frequency.

In an embodiment, a method comprises determining an optimized sampling frequency; sampling a centrifugal acceleration of a tire pressure monitoring system (TPMS) wheel module at the optimized sampling frequency; transmitting signals from the wheel module to a central receiver unit; building a correlation table of counter values from counters coupled to anti-lock braking systems (ABS) at each wheel of a vehicle, the counter values read when the transmitted signals are received by the central receiver unit; reviewing the correlation table for stable counter values associated with TPMS module identification codes; determining a TPMS module identification code associated with the stable counter values; and localizing TPMS wheel modules by assigning an ABS counter associated with the stable counter values to the determined TPMS module identification code.

In an embodiment, a system comprises a plurality of wheel modules, each wheel module associated with a wheel of a vehicle and comprising a sensor configured to sense a condition related to the wheel; a plurality of counters, each counter associated with an anti-lock braking system and a wheel of the vehicle; and a central receiver unit configured to receive signals from the plurality of wheel modules, each signal comprising a wheel module identification code, to fill a correlation table of counter values taken from each of the plurality of counters when a signal is received from one of the plurality of wheel modules, and to localize each wheel of the vehicle by assigning a counter having stable counter values to a wheel module originating a signal when the stable counter values were obtained.

BRIEF DESCRIPTION OF THE DRAWINGS

The invention may be more completely understood in consideration of the following detailed description of various embodiments of the invention in connection with the accompanying drawings, in which.

Figure 1:
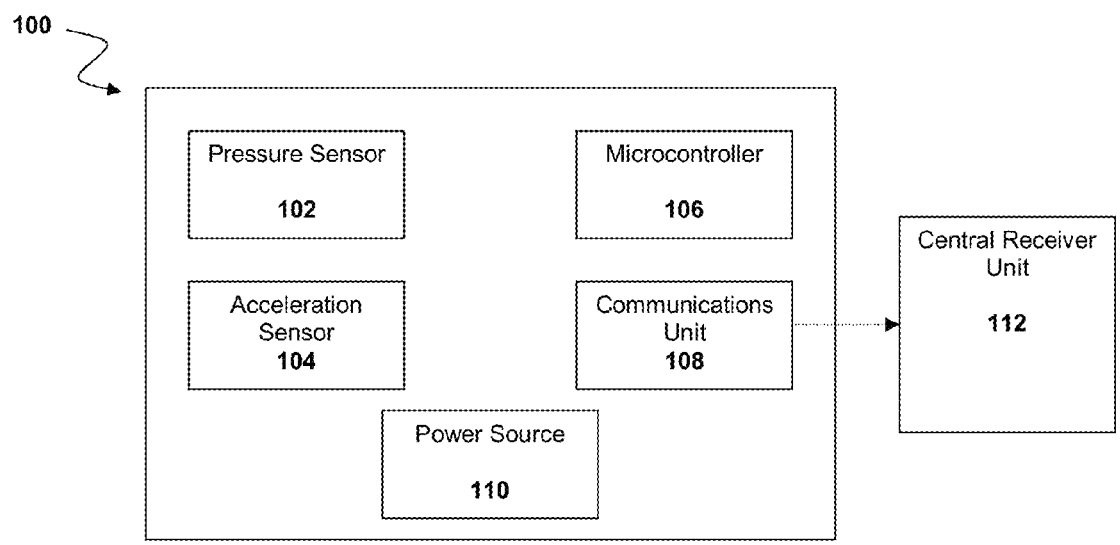
FIG. 1 depicts a block diagram of a wheel module according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to unidirectional TPMS utilizing information from a corresponding vehicle system in order to correlate with vehicle speed information to be used in a tire localization methodology. In an embodiment, the vehicle system is an anti-lock brake system (ABS), and the vehicle speed can be used in a localization scheme that reconstructs a +/−1 g ripple with waveform, amplitude, frequency and phase parameters. Because the waveform is known to be sinusoidal (due to the wheel rotation), the amplitude is known to be 2 g peak-to-peak (due to the gravitational +/−1 g), the frequency depends on vehicle speed (which can be estimated from centrifugal force measurements), and an algorithm is discussed herein for determining the phase by correlation, the +/−1 g ripple can be reconstructed and the wheels localized therefrom.

Advantages of the aforementioned approach include a simpler system and the ability to use a lower resolution ADC, such as a 10-bit ADC in an embodiment, with a shorter acquisition time. The reduced ADC requirements lead to embodiments that minimize die area, provide stable performance, and minimize current consumption. Another advantage is functionality over a range of vehicle speeds, such as up to about 120 to about 150 kilometers per hour (KPH) or more, with one suitable vehicle speed range being about 20 to about 70 KPH, or about 12.5 to about 43.5 miles per hour (MPH).

FIG. 1 depicts a wheel module 100 according to an embodiment. Wheel module 100 comprises a pressure sensor 102, an acceleration sensor 104, control circuitry such as a microcontroller 106, a communications unit 108 and a power source 110 in an embodiment.

Pressure sensor 102 is used to monitor the pressure of the tire by periodically sensing the pressure. Acceleration sensor 104 can be used to detect rotation, which helps to reduce power consumption by only taking pressure measurements when the vehicle is in motion.

Communications unit 108 comprises a radio frequency (RF) transmitter in one embodiment to transmit signals to a central receiver unit 112. In a unidirectional TPMS embodiment, module 100 is autonomous in that it transmits to but does not receive wireless communications from central receiver unit 112, reducing power consumption. In other embodiments, communications unit 108 can comprise an RF transmitter/receiver or some other wireless communications module. Power source 110 comprises a battery or other suitable power source in embodiments.

Wheel module 100 can be mounted in a tire, such as to the rim in an embodiment. A typical passenger vehicle having four wheels will therefore have four wheel modules, one in each tire, enabling each wheel module 100 to monitor the tire pressure of the tire associated with the wheel in which it is mounted. In embodiments, wheel module 100 can comprise more or fewer components. For example, wheel modules 100 typically comprise a temperature sensor in order to provide temperature compensation. Additional sensors, such as to monitor other characteristics of the tire, wheel and environment, can also be included in other embodiments.

Figure 2:
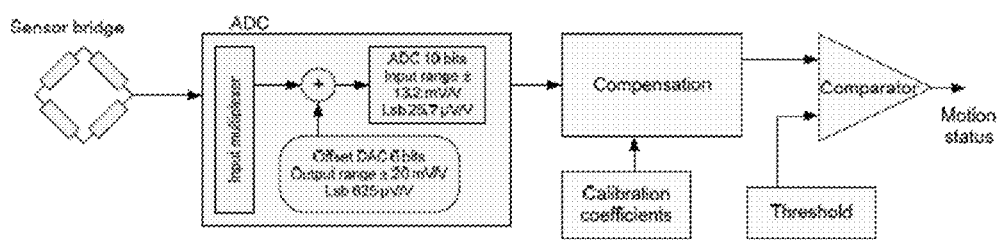
FIG. 2 depicts a block diagram of ADC circuitry according to an embodiment.

Wheel module 100 also comprises additional circuitry associated with and/or coupling the various components. For example, ADC circuitry is coupled to one or both of pressure sensor 102 and acceleration sensor 104 in embodiments. As previously mentioned, a lower resolution ADC can be suitable, and an embodiment of an example lower resolution ADC configuration is depicted in FIG. 2. The particular characteristics and values included in FIG. 2 are exemplary of only one embodiment and can vary in other embodiments. A lower resolution ADC contributes to overall lower power consumption of wheel module 100, an advantage of embodiments. A primary power consumer in wheel module is microcontroller 106. Therefore, minimizing on-time of microcontroller 106, including by keeping algorithms and calculations efficient, is a significant consideration in power savings.

Figure 3:
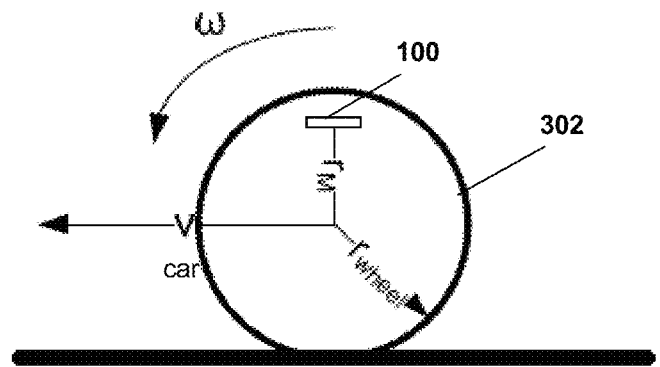
FIG. 3 depicts a block diagram of a wheel and wheel module according to an embodiment.

FIG. 3 is a simplified block diagram of wheel module 100 mounted in a wheel 302. As discussed above, it is desired to know the waveform, amplitude, frequency and phase of the +/−1 g ripple. Because the waveform, amplitude and frequency are known or can be estimated, the phase is left to be determined. In an embodiment, the phase can be determined from the current vehicle speed because the phase is directly corresponds with the geometric rotation angle of the wheel.

Figure 4:
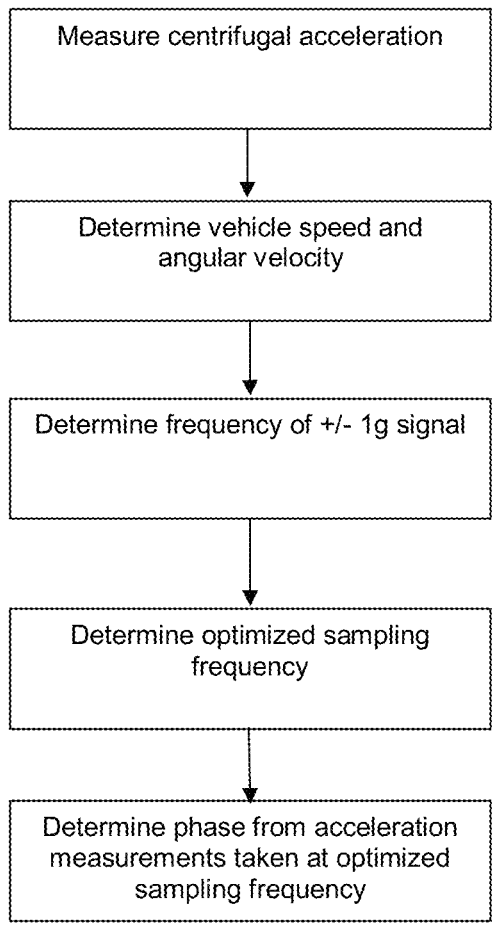
FIG. 4 is a flowchart of a method according to an embodiment.

Referring also to FIG. 4, the absolute value of the centrifugal acceleration, $a_{WheelModule}$, is measured. The radius of the centripetal motion is used to calculate the driving speed and the angular velocity, $\omega$, of wheel module 100. This radius depends on the mounting position of wheel module 100, such as on the rim or on the rubber of the tire. FIG. 3 depicts $r_M$, the radius of wheel module 100, and $r_{wheel}$, the radius of the tire surface. The rim and/or tire size are typically stored in the non-volatile memory of microcontroller 106 in embodiments. From $r_{wheel}$, the perimeter, p, of the tire can also be calculated:

$$p = 2\pi \ast r_{wheel}$$

From the angular velocity, $\omega$, the frequency, f, of the +/−1 g signal can be derived:

$$\omega = 2\pi f = v_{car}/r_{wheel}$$

The centrifugal acceleration, $a_{WheelModule}$, of wheel module 100 is:

$$a_{WheelModule} = r_M \ast \omega^2 = r_M \ast (v_{car}/r_{wheel})$$

From this, an optimized sampling frequency, $f_s$, can be determined:

$$f_s = v_{car}/u = v_{car}/(2\pi \ast r_{wheel}) = (\text{sqrt}(a_{WheelModule}/r_M)) \ast (1/2\pi) \ast c_o$$

where $c_o$ is an oversampling factor constant. In embodiments, $c_o$ can be 4 or 8 or some other suitable value to account for errors and other factors affecting the otherwise minimum sampling frequency.

As the shape (sinusoidal), the amplitude (+/−1 g) and the frequency (tire radius, centrifugal acceleration) of the +/−1 g signal are now known, only the phase of the signal needs to be measured. Therefore, in an embodiment, one or more additional acceleration measurements are taken at the estimated optimized sampling frequency to measure the phase of the sinusoidal wave. Knowing an optimized sampling frequency is beneficial because each measurement draws battery power. In an embodiment, a sequence of eight samples distributed over one period of the +/−1 g ripple can be sufficient, though other sampling protocols can be used in other embodiments.

In embodiments, these and other calculations are performed by microcontroller 106. In other embodiments, data can be transmitted to central receiver unit 112 for calculations, as central receiver unit 112 does not have the same power consumption limitations as microcontroller 106.

Thus, microcontroller 106 can transmit the wheel angle to central receiver unit 112 in an embodiment. In an embodiment, the transmission is synchronized to the wheel rotation angle, e.g. transmit only when wheel module 100 is at 0 degrees. In another embodiment, transmissions can be synchronized with an angle at which transmission signal strengths are optimized based on the mounting of wheel module 100 and relative positioning with respect to central receiver unit 112.

In an embodiment, it is sufficient to detect the wheel angle with an accuracy of about +/−90 degrees or more, so long as the statistical distribution of the error is generally well-centered around the accurate phase value.

Once the wheel angle is communicated to central receiver unit 112, the wheel module speed can be correlated with ABS speed signals in an embodiment. A purpose of this correlation can be to find TPMS/ABS signal pairs that correspond to the assignment of wheel module unique identification codes associated with each ABS signal wire (which, unlike the tires, are not rotated during the life of the tire and thereby maintain their relative positions) in order to localize the tires.

Figure 5:
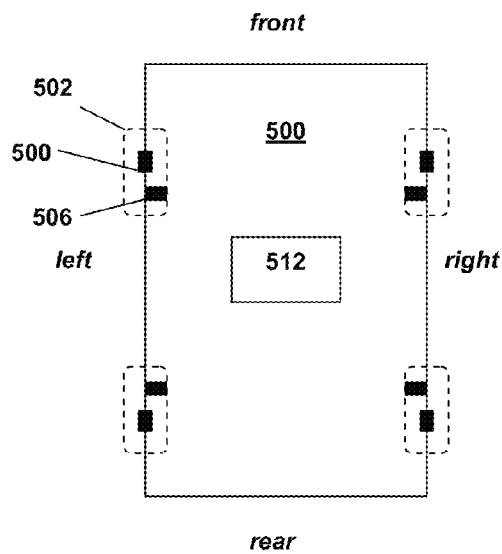
FIG. 5 depicts a block diagram of a vehicle according to an embodiment.

Referring to FIG. 5, each wheel 502 of a vehicle 504 comprises a TPMS wheel module 500 and an ABS 506. A central receiver unit 512 is mounted elsewhere in vehicle 504.

Figure 6A:
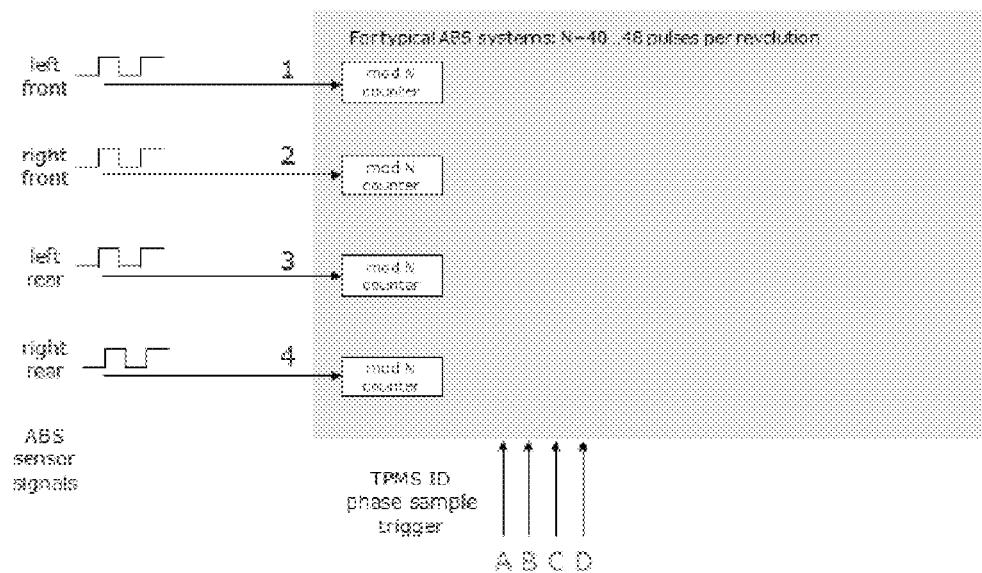
FIG. 6A depicts a counter table according to an embodiment.

Referring to FIG. 6A, in an embodiment, each wheel speed signal (1, 2, 3, 4) of each ABS 506 is coupled to a modulo-N counter, where N is the number of pulses of the selected pole wheel. Typical ABS use pole wheels with N=40 ... 48, though this can vary in embodiments. In other words, one revolution of the wheel corresponds to N pulses. Valid received RF communication frames from each TPMS 500 are used as trigger signals (A, B, C, D) for further processing of the above-described modulo-N counters.

Figure 6B:
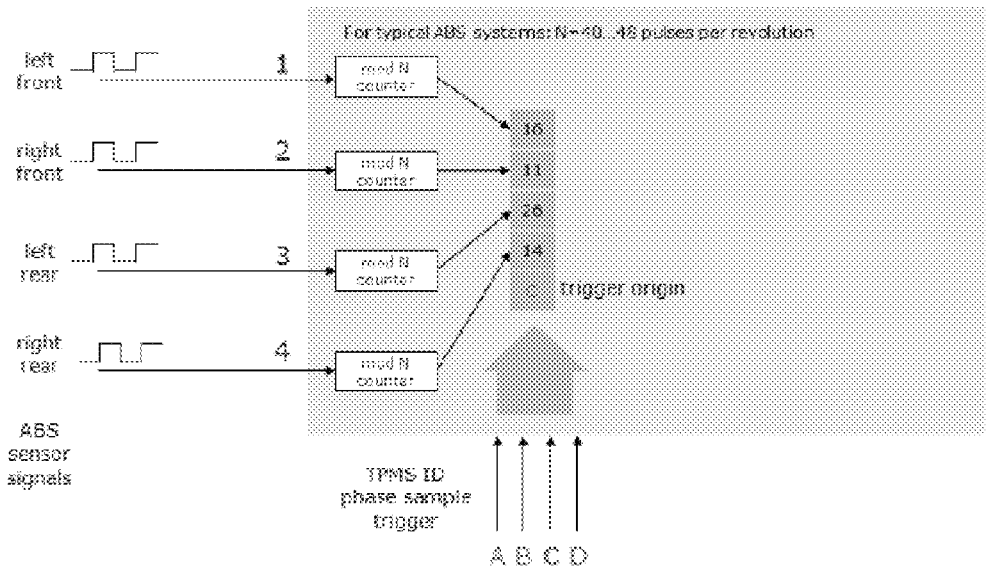
FIG. 6B depicts a counter table and a correlation table according to an embodiment.
Figure 7:
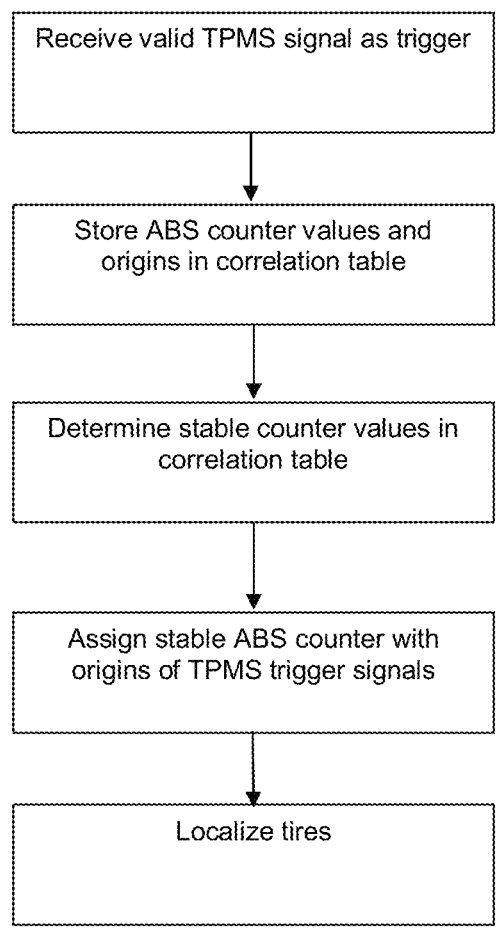
FIG. 7 is a flowchart of a method according to an embodiment.

Referring to FIG. 6B and FIG. 7, upon reception of a valid RF frame (wheel module ID code A, B, C, or D), current counter values are stored in a correlation table. The origin (trigger) of each sample is stored with the counter values, as shown in FIG. 6B for wheel mode ID C).

Figure 6C:
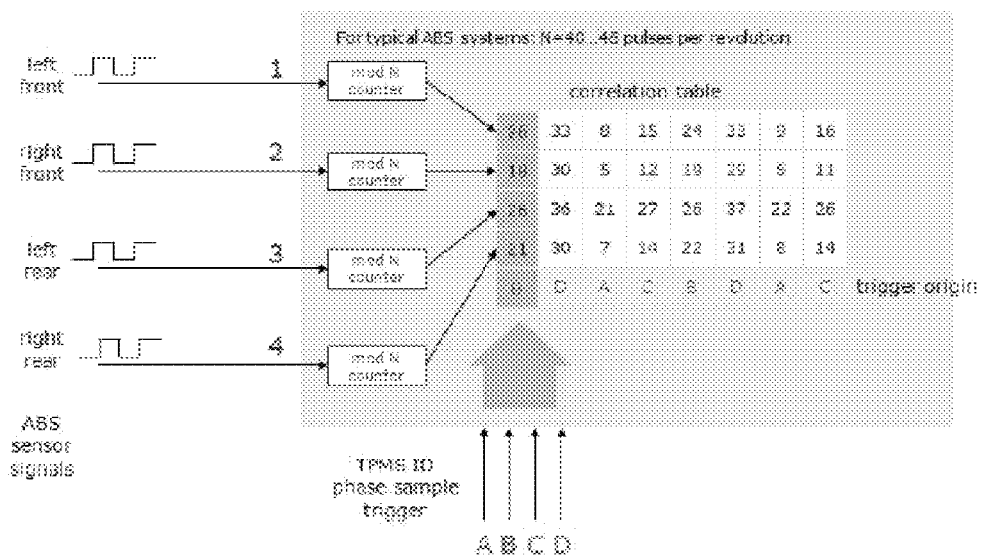
FIG. 6C depicts a counter table and a correlation table according to an embodiment.

Referring to FIG. 6C and FIG. 7, successive RF frames will trigger additional entries for the correlation table until the table has a minimum number of entries. In an embodiment, eight entries can be sufficient under optimal conditions, which can include significant differences in wheel speeds and low jitter of trigger signals. More entries can be used in other, more realistic embodiments, though this example embodiment will continue assuming eight valid samples.

In each row of the correlation table, the stored counter values related the same trigger origin are reviewed. For example:

Row 1: A: 8, 9; B: 26, 24; C: 15, 16; D: 33, 33
Row 2: A: 5, 5; B: 18, 19; C: 12, 11; D: 30, 29
Row 3: A: 21, 22; B: 26, 26; C: 27, 26; D: 36, 37
Row 4: A: 7, 8; B: 21, 22; C: 14, 14; D: 30, 31

For each row, the trigger origin with the most stable counter value (bold and italics above) is determined. Under ideal conditions (e.g., zero wheel phase error and constant trigger latency) for one of the trigger origins, the counter value will remain constant. Under real conditions, the counter values for one of the trigger origins will remain inside a more or less narrow windows, whereas values opposite tot eh median value will not occur, or, depending on the source of the error, the stored counter values will occur with the highest probability around a given median value. For all the other trigger origins, the counter values will become more and more uniformly distributed the longer the correlation table becomes. This shift is generally caused by differing wheel speeds and changing wheel angles.

As a result of the above analysis, the simplified example given will provide the following result:

Row 1: A: 8, 9; B: 26, 24; C: 15, 16; D: 33, 33→1:D
Row 2: A: 5, 5; B: 18, 19; C: 12, 11; D: 30, 29→2:A
Row 3: A: 21, 22; B: 26, 26; C: 27, 26; D: 36, 37→3:B
Row 4: A: 7, 8; B: 21, 22; C: 14, 14; D: 30, 31→4:C

The assignment of the trigger origins (A, B, C, D), in actuality the TPMS wheel module IDs, to ABS sensor signals (1, 2, 3, 4) as described above is the localization result, which is obvious in this simplified example:

TPMS Wheel Module ID A=ABS signal 2 (right front)
TPMS Wheel Module ID B=ABS signal 3 (left rear)
TPMS Wheel Module ID C=ABS signal 4 (right rear)
TPMS Wheel Module ID D=ABS signal 1 (left front)

Under less than ideal conditions, the correlation table can be enlarged until there is an unambiguous result. In an embodiment, the correlation table can be limited to a predetermined size and handled as a first-in, first-out (FIFO) buffer. Poor conditions can be manifested as wheel phase errors caused by difficult road conditions (e.g., gravel) and only small differences in wheel speeds (e.g., on straight roads).

An advantage of embodiments is the possibility to judge the maturity of the result (no localization possible ... unambiguous localization). A tire defect can influence tire circumference, which in turn affects wheel speed. In other words, the algorithm is increasingly robust in cases of critical tire conditions. Another advantage is the fact that continuous monitoring of the wheel speeds and/or wheel revolution count inside each wheel module is not required. An irrelevant number of wheel revolutions can therefore occur between samples.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method comprising:
receiving signals comprising tire pressure monitoring system (TPMS) module identification codes;
building a correlation table of counter values from counters coupled to anti-lock braking systems (ABS) at each wheel of a vehicle;
reviewing the correlation table for stable counter values associated with TPMS module identification codes;
determining a TPMS module identification code associated with the stable counter values;
localizing TPMS wheel modules by assigning an ABS counter associated with the stable counter values to the determined TPMS module identification code.

2. The method of claim 1, further comprising receiving counter values from the counters, the counter values of each counter related to pulses of a pole wheel associated with a wheel associated with the counter.

3. The method of claim 2, wherein the counters comprise modulo-N counters.

4. The method of claim 1, further comprising associating a unique identifier with each counter.

5. The method of claim 1, wherein building a correlation table comprises filling columns with a counter value from each counter upon receipt of a valid signal from a TPMS module and associating each column with the TPMS module identification code that sent the valid signal.

6. The method of claim 1, further comprising triggering counter readings for building the correlation table when a valid signal from a TPMS module is received.

7. A method comprising:
measuring a centrifugal acceleration of a tire pressure monitoring system (TPMS) wheel module;
determining a frequency of a +/−1 g signal associated with the wheel module;
determining an optimized sampling frequency; and
determining a phase of the +/−1 g signal by measuring the centrifugal acceleration of the wheel module at the optimized sampling frequency.

8. The method of claim 7, further comprising repeating the measuring, the determining of a frequency, the determining of an optimized frequency and the determining of a phase for each wheel of a vehicle.

9. The method of claim 7, further comprising determining a vehicle speed and an angular velocity of the wheel module.

10. The method of claim 7, further comprising determining a wheel angle associated with the wheel module.

11. The method of claim 10, further comprising communicating the wheel angle to a central receiver unit.

12. The method of claim 7, further comprising sensing a pressure by the TPMS wheel module.

13. The method of claim 7, further comprising measuring at least one additional centrifugal acceleration according to the optimized sampling frequency.

14. The method of claim 7, wherein determining an optimized sampling frequency comprises determining a minimum sampling frequency, and adjusting the minimum sampling frequency by an oversampling factor constant.

15. A method comprising:
determining an optimized sampling frequency;
sampling a centrifugal acceleration of a tire pressure monitoring system (TPMS) wheel module at the optimized sampling frequency;
transmitting signals from the wheel module to a central receiver unit;
building a correlation table of counter values from counters coupled to anti-lock braking systems (ABS) at each wheel of a vehicle, the counter values read when the transmitted signals are received by the central receiver unit;
reviewing the correlation table for stable counter values associated with TPMS module identification codes;
determining a TPMS module identification code associated with the stable counter values; and
localizing TPMS wheel modules by assigning an ABS counter associated with the stable counter values to the determined TPMS module identification code.

16. The method of claim 15, wherein determining an optimized sampling frequency comprises determining a phase of a +/−1 g signal associated with a tire pressure monitoring system (TPMS) wheel module.

17. The method of claim 15, further comprising sensing a pressure by a pressure sensor of the TPMS wheel module.

18. A system comprising:
a plurality of wheel modules, each wheel module associated with a wheel of a vehicle and comprising a sensor configured to sense a condition related to the wheel;
a plurality of counters, each counter associated with an anti-lock braking system and a wheel of the vehicle; and
a central receiver unit configured to receive signals from the plurality of wheel modules, each signal comprising a wheel module identification code, to fill a correlation table of counter values taken from each of the plurality of counters when a signal is received from one of the plurality of wheel modules, and to localize each wheel of the vehicle by assigning a counter having stable counter values to a wheel module originating a signal when the stable counter values were obtained.

19. The system of claim 18, wherein each of the plurality of wheel modules comprises a tire pressure monitoring system (TPMS) wheel module.

20. The system of claim 19, wherein each TPMS wheel module comprises a pressure sensor.

21. The system of claim 20, further comprising analog-to-digital converter (ADC) circuitry coupled to the pressure sensor.

22. The system of claim 19, wherein each TPMS wheel module comprises an acceleration sensor.

23. The system of claim 18, wherein each of the plurality of wheel modules comprises a radio frequency (RF) communications unit.

24. The system of claim 18, wherein each of the plurality of counters comprises a unique identification code to associate each counter with a wheel of the vehicle.

25. The system of claim 18, wherein each of the plurality of counters comprises a modulo-N counter configured to measure pole wheels of the wheel.

* * * * *